United States Patent [19]

Friedman

[11] 4,324,204
[45] Apr. 13, 1982

[54] ANIMAL SAFETY RESTRAINT FOR VEHICLES

[76] Inventor: Michael E. Friedman, 428 Mount Olive Dr., Bradbury, Calif. 91010

[21] Appl. No.: 178,743

[22] Filed: Aug. 18, 1980

[51] Int. Cl.³ .................... A01K 3/00; A01K 27/00
[52] U.S. Cl. ................................................ 119/96
[58] Field of Search ............... 119/96, 109, 143; 54/79; 297/473

[56] References Cited

U.S. PATENT DOCUMENTS

| | | | |
|---|---|---|---|
| 2,539,606 | 1/1951 | Bailey | 119/143 |
| 2,695,052 | 11/1954 | Yates et al. | 119/96 X |
| 3,169,036 | 2/1965 | Spooner | 297/473 |
| 3,301,594 | 1/1967 | Pukish, Jr. | 297/473 |
| 3,310,034 | 3/1967 | Dishart | 119/96 |

FOREIGN PATENT DOCUMENTS 207664  4/1957  Australia .................... 297/473

*Primary Examiner*—Hugh R. Chamblee
*Attorney, Agent, or Firm*—Fraser and Bogucki

[57] ABSTRACT

A safety restraint for securing a dog to the seat of an automotive vehicle includes a one-piece harness having opposing tabs secured to each other by releasable adhesive strips at the chest and beneath the shoulders and flanks of the animal, and permitting freedom of movement but providing a shock distributing shell about the body length of the animal. A pair of rings coupled to the side of the harness in the region of the shoulder and flank of the animal are releaseably coupled to clips mounted on a pair of belts secured about the back of the seat. The clips are individually slidable in upward and downward directions along the lengths of the belts by separate straps which receive the clips and extend along portions of the length of the belts. This permits the animal to stand, sit or lie on the seat while at the same time limiting sideward or forward motion of the animal in the event of a sudden stop or collision. Shocks are partially absorbed within the belt and harness structure, and forces that are not absorbed are uniformly distributed in such manner that there is no injury to the spinal column or localized tightening or restraint.

7 Claims, 6 Drawing Figures

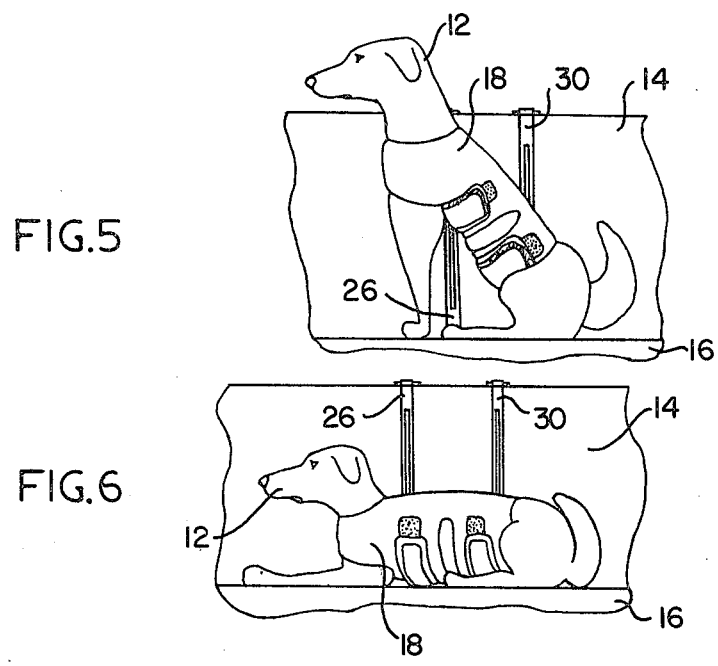
FIG. 5
FIG. 6
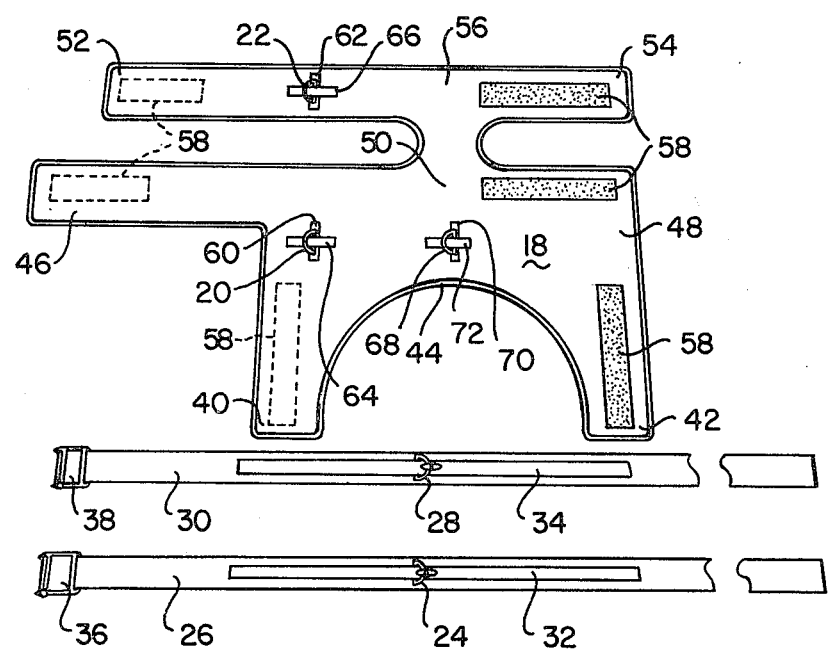
FIG 2

ANIMAL SAFETY RESTRAINT FOR VEHICLES

FIELD OF THE INVENTION

The present invention relates to safety restraints for use in automotive vehicles, and more particularly to those restraints especially designed to secure and protect four legged animals such as dogs.

HISTORY OF THE PRIOR ART

It is known to provide safety harnessing arrangements for animals such as dogs traveling in automotive vehicles. Examples of such arrangements are provided by U.S. Pat. Nos. 3,310,034 of Dishart; 3,948,222 of Longshore et al; and 2,909,154 of Thomas. In the Dishart and Longshore et al arrangements a type of harness is secured across the chest and around the shoulders of the dog. In Dishart the harness is coupled to the seat of the vehicle by a strap which emanates from both sides of the seat and is secured to both the rear and forward portions of the harness. In Longshore et al the harness is coupled to the floor of the vehicle beneath the seat by a single chain. In the Thomas patent a conventional collar surrounding the neck of the dog is coupled to a leash which in turn is secured to the back of the seat.

The difficulty in designing an effective safety restraint for use with animals such as dogs in vehicles relates to the compromise between safety and comfort. Most such arrangements such as the ones shown in the Dishart, Longshore et al and Thomas patents attempt to provide reasonable comfort for the animals but at the expense of a considerable sacrifice in safety. Such arrangements offer some assistance in restraining or confining a highly active animal during vehicle travel. While they may provide some protection for the animal in the event of a sudden stop or minor collision, the safety thereof is limited by the nature of the design. For example, in the Dishart arrangement the portion of the harness surrounding the dog's neck tends to choke the animal and may otherwise severely injure the neck in the event of a substantial impact. For that matter the dog is disposed in a forward-facing position so as to place undue strain on the animal via the harness even when the dog is seated or lying on the seat. The location of the various parts of the harness on the dog's body is such as to place undue stress on the animal's spinal column, particularly where forces are exerted on the animal from the side as well as the front.

The arrangement shown in the Longshore et al patent involves similar problems, and in addition can allow substantial movement of the animal prior to restraint because of the use of a long, relatively slack chain.

The arrangement shown in the Thomas patent which is described as a tethering arrangement provides at best some limitation in the motion of the dog but very little in the way of safety restraint in the event of sudden stop or collision. Indeed the arrangement shown in Thomas might prove less safe than the absence of any type of restraining arrangement because all of the restraining force is applied to the neck of the animal.

It is known to provide restraining systems for living beings which provide some freedom of movement along predetermined paths or in predetermined directions as shown, for example, by the relatively complex apparatus in U.S. Pat. No. 3,583,322 of Vykukal. To date, however, such principles have not been successfully converted into relatively simple and therefore practical arrangements for harnessing animals such as dogs in automotive vehicles.

Nor have various animal harnesses, covers, blankets and the like as shown for example by U.S. Pat. No. 1,437,255 of Mallinson, U.S. Pat. No. 134,921 of Morris and U.S. Pat No. 4,036,179 of Turner et al been modified for use in conjunction with safety restraint arrangements.

Accordingly, it is an object of the invention to provide an improved safety restraint for use with animals in automotive vehicles.

It is a further object of the invention to provide an animal safety restraint which permits some movement such as the ability of the animal to assume standing, sitting and lying positions while at the same time providing substantial protection for the animal in the event of a sudden stop or collision.

It is a further object of the invention to provide an animal safety restraint which distributes the forces of a sudden stop or collision over various portions of the animal's body so as to not unduly stress the spinal column of the animal or the neck or other particular portion of the animal's body.

BRIEF DESCRIPTION OF THE INVENTION

The above and other objects and features are accomplished in accordance with the invention by the provision of a safety restraint system which includes an easily attached unitary harness which encompasses the chest, front hips and rear flanks of the animal. The harness is coupled to the seat back of the vehicle by a pair of rings, one of which is coupled to the harness adjacent the front hip of the animal and the other of which is coupled to the harness in the vicinity of the rear flank of the animal. The rings are releaseably coupled to clamps which are slidably coupled to a pair of belts wrapped around and secured to the seat back. Independent upward and downward movement of each ring-clamp combination is permitted by a strap slidably mounting the clamp and having the opposite ends thereof secured to one of the belts along the length thereof.

The separate and independent sliding action afforded by each ring-clamp combination enables the dog to stand, sit or lie on the front seat. At the same time, sideward and forward motion of the harness is substantially limited, with just enough movement being allowed to provide a desired amount of shock absorption in the belt and harness system. The one-piece design of the harness incorporates several opposed wings or tabs which are easily secured but firmly attached to each other across the chest and under the front shoulders and rear flanks. This unitary protective body shell combines with the location of the rings and the limited extensibility of the belts to distribute the forces of a sudden stop or impact uniformly through the body of the animal, without localized distortion of the spinal column or any cinching, choking or cutting effects.

The rings are preferably disposed within apertures in the harness and secured to the harness by strips of material passing through the rings and joined to the harness at the opposite sides of the apertures. This feature allows the rings to protrude from either side of the harness so that the harness may be applied in reverse fashion to the animal to enable the animal to face in a different direction.

The safety restraint system is easily installed in an automotive vehicle by simply securing the two belts in spaced-apart relation around the seat back so as to be generally vertically disposed. The harness is easily installed on and removed from the animal because of its design and by use of adhesive but releasable strips which facilitate attachment of the opposite tabs of the harness. The rings are easily attached to and detached from the clamps.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 2 is a perspective view of the harness and pair of belts comprising the safety restraint of FIG. 1;

FIG. 5 is a side view of the dog with safety restraint showing the manner in which the dog may assume a sitting position; and FIG. 6 is a side view of the dog with safety restraint showing the manner in which the dog can assume a lying position.

DETAILED DESCRIPTION

Figure 1:
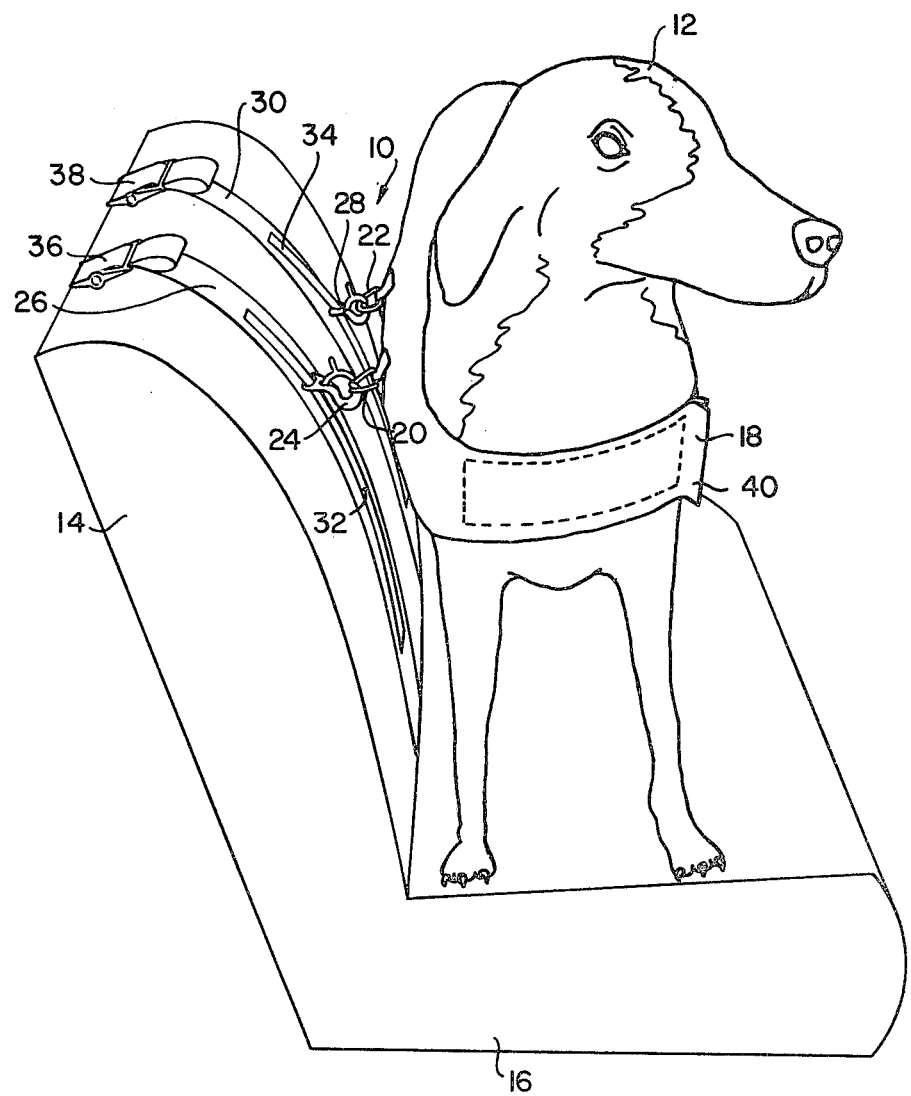
FIG. 1 is a perspective view of a safety restraint in accordance with the invention shown securing a dog to the seat back of a vehicle.

FIG. 1 depicts a safety restraint 10 in accordance with the invention for securing a dog 12 or similar four-legged animal to the back 14 of a seat 16 of an automotive vehicle. The safety restraint 10 includes a unitary harness 18 worn by the dog 12 and having a pair of rings 20 and 22 coupled thereto. The ring 20 is releaseably coupled to a clamp 24 mounted on a belt 26. In like fashion the ring 22 is releaseably coupled to a clamp 28 mounted on a belt 30.

The clamp 24 is slidable along a portion of the length of the belt 26 by being slidably mounted on a strap 32 extending along a portion of the length of and having its opposite ends coupled to the belt 26. In like fashion the clamp 28 is slidably mounted on a strap 34 extending along a portion of the length of and having the opposite ends thereof coupled to the belt 30. The belt 26 is mounted on the seat 16 in generally vertically disposed fashion by being wrapped around the seat back 14 with the opposite ends thereof joined together at a buckle 36. The belt 30 is mounted in generally parallel, spaced-apart relation to the belt 26 and in generally vertically disposed fashion with the opposite ends thereof being joined together at a buckle 38.

FIG. 2 depicts the harness 18 before installation on the dog 12 and the belts 26 and 30 before installation on the seat back 14. The belts 26 and 30 are made of any appropriate strong and yet flexible material such as leather or high strength fabric. The straps 32 and 34 are made of similar material and are coupled to the belts 26 and 30 at their opposite ends such as by stitching, riveting or other appropriate fastening technique.

The harness 18 is comprised of a single piece of material such as canvas or similar fabric, although leather or other materials might also be used. The harness 18 is configured so as to include a pair of wings or tabs 40 and 42 at a front end 44 thereof, a pair of tabs 46 and 48 at an intermediate portion 50 thereof, and a pair of tabs 52 and 54 at a rear portion 56 thereof. Each of the tabs 40, 42, 46, 48, 52 and 54 is provided with an adhesive strip 58 of Velcro or similar material which is easily secured and strongly united except when properly separated. The adhesive strips 58 are mounted on the undersides of the tabs 40, 46 and 52 and the top sides of the tabs 42, 48 and 54 as viewed in FIG. 2.

The harness 18 is installed on the dog 12 by placing the intermediate portion 50 on top of the dog's back so that the front end 44 is immediately behind the neck of the dog and the rear portion 56 is toward the rear of the dog. The tabs 40 and 42 at the front end 44 of the harness 18 are pulled across the chest of the dog and pressed together in an overlapping relation so that the adhesive strips 58 thereon secure to each other. The tab 46 is pulled under the shoulders of the dog and into an overlapping relation with the tab 48 so that the adhesive strips 58 thereon adhere to each other. The tab 52 is pulled under the flanks of the dog and into an overlapping relation with the tab 54 so that the adhesive strips 58 thereon are adhered to each other. Thus the animal is encompassed within a protective shell that secures the chest, ribs and flanks of the animal, protecting the spinal column and the body as a whole. Removal of the harness 18 from the dog 12 requires a simple peeling action on the tabs 40, 46 and 52 to separate the various adhesive strips 58.

Figure 3:
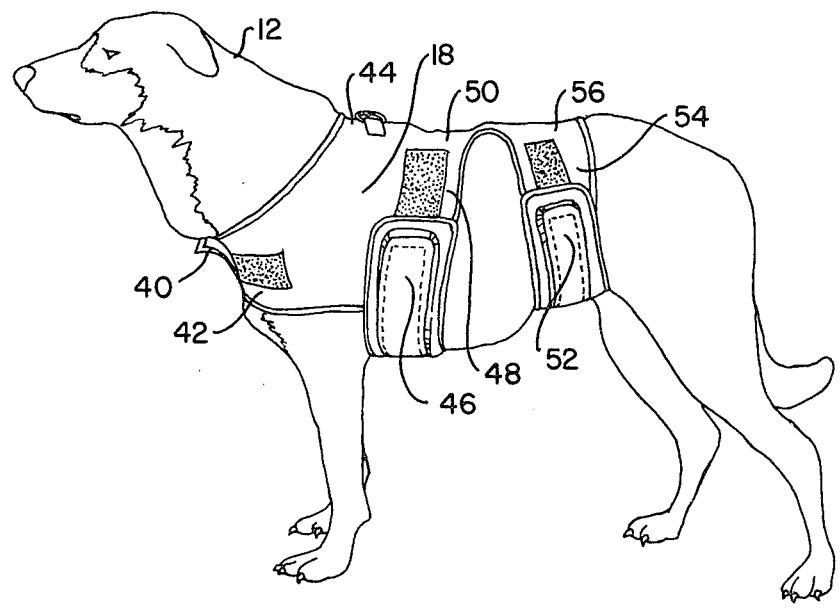
FIG. 3 is a left side view of the dog of FIG. 1 with the harness in place.
Figure 4:
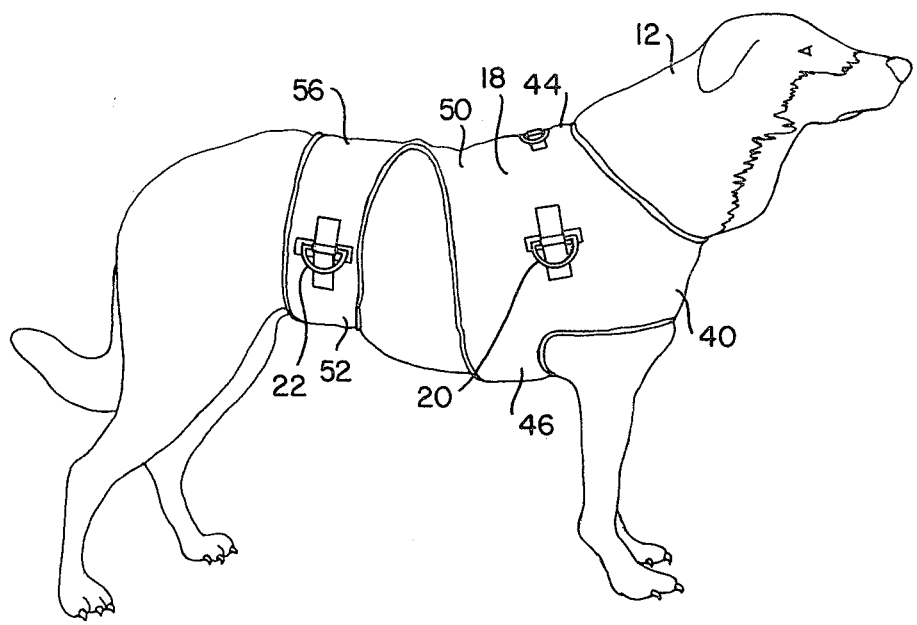
FIG. 4 is a right side view of the dog of FIG. 1 with the harness in place.

The details of the harness 18 when installed on the dog 12 are shown in FIGS. 3 and 4.

As shown in FIGS. 2 and 4 the rings 20 and 22 are coupled to the harness 18 by being disposed in apertures 60 and 62 respectively within the harness 18. The ring 20 which is disposed within the aperture 60 is coupled to the harness 18 by a strip 64 of material extending across the aperture 60 and having its opposite ends secured such as by sewing to the harness 18 on the opposite sides of the aperture 60. In like fashion, the ring 22 is disposed within the aperture 62 and surrounds a strip 66 of material extending across the aperture 62 and secured at the opposite sides of the aperture 62 to the harness 18. This particular mounting arrangement for the rings 20 and 22 enables the harness 18 to be reversible. When the harness 18 is installed in the reversed position, the side of the harness 18 shown in FIG. 2 is placed in contact with the dog 12. The various tabs 40, 42, 46, 48, 52 and 54 are then joined together in the manner previously described with the exception that in the reverse position the tabs 42, 48 and 54 are placed on the outside of or on top of the tabs 40, 46 and 52. The practical effect of installation of the harness 18 in the reverse position is to dispose the rings 20 and 22 on the left side rather than the right side of the dog 12. The rings 20 and 22 are able to protrude from the opposite side of the harness 18 because of the manner in which they are coupled to the harness 18. The ring 20 which is again positioned at the middle of the dog's shoulder but on the left side of the dog is attached to the clamp 28. The ring 22 which is again positioned at the flank but on the left side of the dog is secured to the clamp 24. This positions the dog 12 in the opposite direction relative to the seat back 14 from that shown in FIG. 1.

A ring 68 is coupled to the harness 18 at a central region thereof adjacent the front end 44. The ring 68 is coupled to the harness 18 in the same manner as the rings 20 and 22 by being disposed within an aperture 70 and being mounted on a strip 72 of material extending across the aperture 70. The ring 68 provides a convenient attachment point for a leash when the rings 20 and 22 are uncoupled from the clamps 24 and 28 and the dog 12 is removed from the vehicle. The ring 68 is reversible so as to protrude from the opposite side of the harness 18 when the harness is installed on the dog in the reverse position.

The ability of the clamps 24 and 28 to slide along the generally vertically disposed portions of the elongated elements comprised by the belts 26 and 30 enables the dog 12 to assume various different positions while at the same time safely restraining the dog. In FIG. 1 the clamps 24 and 28 reside at upper positions along the lengths of the strips 32 and 34 permitting the dog 12 to stand on the seat 16. At the same time the relatively close coupling between the harness 18 and the belts 26 and 30 prevents substantial lateral movement of the dog 12 relative to the seat 16. Movement of the dog 12 in the forward direction is also restricted to the small amount of resiliency in the various parts of the safety restraint 10 and the tightness of the fit of the harness 18 on the dog 12 and the belts 26 and 30 on the seat back 14. This small amount of movement has a shock absorbing action which tends to also distribute forces over the body of the dog 12 via the harness 18.

FIG. 5 depicts the dog 12 in a sitting position. The dog 12 is able to move swiftly and easily into the sitting position of FIG. 5 from the standing position of FIG. 1 by downward sliding motion of the clamp 28 along the strip 34. With the dog in the sitting position of FIG. 5, lateral and forward motion of the dog are again substantially restricted.

A lying position of the dog 12 which is shown in FIG. 6 is accomplished by downward movement of the clamp 24 along the strap 32. In this position the lateral and forward movement of the dog are again substantially restricted.

The safety restraint 10 in accordance with the invention has been found to provide the dog with a reasonable amount of movement including standing, sitting and lying positions while at the same time substantially restraining any forward or sidewise movement of the dog relative to the seat back 14. The design of the harness 18 combined with the placement of the rings 20 and 22 acts to distribute forces quite evenly over the entire body of the dog, and above all prevents whiplash and similar types of injuries to the spinal column which are prevalent with other types of animal restraint systems. Upon an impact, the mass of the animal seeks to move forward, but the shock is initially absorbed to a considerable extent by the somewhat extendible and resilient belts. When the limits of forward travel permitted by the belt system is reached, the entire body length of the animal, being encased in the harness, decelerates smoothly and absorbs the remaining shock uniformly.

Upon sensing danger many animals instinctively retract their legs and drop into a lying position of the type shown in FIG. 6, which is freely permitted by the present device. As previously noted, this position virtually prevents any movement of the dog relative to the seat back except in an upward direction. The harness 18 and the belts 26 and 30 are of relatively simple, inexpensive construction. The belts 26 and 30 are easily installed on or removed from the seat back 14 and the harness 18 is easily installed on or removed from the dog 12. However, the harness 18 can also be worn by the dog without inconvenience when not in a vehicle.

While the invention has been particularly shown and described with reference to a preferred embodiment thereof, it will be understood by those skilled in the art that various changes in form and details may be made therein without departing from the spirit and scope of the invention.

What is claimed is:

1. A safety restraint for securing an animal to the seat of a vehicle comprising the combination of a pair of elongated elements adapted to be secured to the back of a seat of a vehicle in spaced-apart relation so as to be generally vertically disposed, a harness adapted to receive a substantial portion of the body of an animal and a pair of releasable fasteners coupled to different portions of the harness, each of the fasteners being adapted to be releasably fastened to a different one of the elongated elements, the pair of fasteners being coupled to the harness adjacent the center of the shoulder and the center of the flank of an animal received by the harness to confine the animal to positions in which the shoulder and the flank of the animal remain adjacent the back of a seat to which the pair of elongated elements are secured.

2. A safety restraint for securing an animal to the seat of a vehicle comprising the combination of a pair of elongated elements adapted to be secured to the back of a seat of a vehicle in spaced-apart relation so as to be generally vertically disposed, a harness adapted to receive a substantial portion of the body of an animal and a pair of releasable fasteners coupled to different portions of the harness, each of the fasteners being adapted to be releasably fastened to a different one of the elongated elements, each of the elongated elements comprising a belt having opposite ends adapted to be joined to each other and a strap extending along a portion of the length of and having opposite ends fastened to the belt, the strap being adapted to releasably receive one of the fasteners thereon and to permit the fastener to slide along the length thereof, each of the releasable fasteners comprising a ring secured to the harness and a clip slidably mounted on the strap of one of the elongated elements and releasably attachable to the ring.

3. The invention set forth in claim 2, wherein the harness is reversible and each ring is mounted to the harness so as to be extendable to either side of the harness.

4. A safety restraint for securing an animal to the seat of a vehicle comprising the combination of a harness and a pair of belts, the harness including a flexible element having a first pair of opposite tabs at a front portion thereof adapted to be joined to each other at the chest of an animal, a second pair of tabs at an intermediate portion thereof adapted to be joined to each other below the shoulders of an animal and a third pair of opposite tabs at a rear portion thereof adapted to be joined to each other below the flanks of an animal, a first ring coupled to the flexible element adjacent the second pair of tabs, a second ring coupled to the flexible element adjacent the third pair of tabs, each of the pair of belts being disposed about the seat back and including a strap extending along a portion of the length of the belt and having opposite ends coupled to the belt, and a clip slidable mounted on the strap and releaseably joinable to one of the rings.

5. The invention set forth in claim 4, wherein each of the tabs is provided with an adhesive but detachable strip.

6. The invention set forth in claim 4, wherein each of the rings is disposed within an aperture in the flexible element and has a strip extending therethrough and joined to the flexible element at the opposite sides of the aperture.

7. A safety restraint for securing an animal to the seat of a vehicle while permitting limited motion of the animal with comfort, comprising the combination of a pair of elongated elements adapted to be secured to and generally vertically disposed relative to the seat of a vehicle, a harness configured to encompass a different portion of the body length of an animal therein and comprising a single member of flexible material adapted to extend along the length of the body of an animal from the chest at a forward portion thereof through the ribs to the flanks at a rearward portion thereof and to encompass the chest, ribs and flanks of the animal, means coupling the forward portion of the harness to a first one of the pair of elongated elements and being slidable along a portion of the lengths of the first one of the pair of elongated elements to permit limited movement of the forward portion of the harness therealong, and means coupling the rearward portion of the harness to a second one of the pair of elongated elements and being slidable along a portion of the length of the second one of the pair of elongated elements to permit limited movement of the rearward portion of the harness therealong, whereby shocks on the animal arising from sudden vehicle movements are absorbed partially in the elongated elements and thereafter distributed along the body length of the animal via the harness.

* * * * *